(12) United States Patent
Suzuki et al.

(10) Patent No.: US 7,539,503 B2
(45) Date of Patent: May 26, 2009

(54) CONTROLLER DEVICE, MOBILE TERMINAL AND MOBILE COMMUNICATION METHOD

(75) Inventors: Toshihiro Suzuki, Yokohama (JP); Motonari Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 581 days.

(21) Appl. No.: 11/265,182

(22) Filed: Nov. 3, 2005

(65) Prior Publication Data

US 2006/0120337 A1 Jun. 8, 2006

(30) Foreign Application Priority Data

Nov. 10, 2004 (JP) .............................. 2004-326779

(51) Int. Cl.
*H04B 7/00* (2006.01)
(52) U.S. Cl. .................... 455/507; 455/426.2; 455/519; 370/254; 370/332; 370/338; 370/352; 370/389
(58) Field of Classification Search ................. 455/507; 370/338
See application file for complete search history.

(56) References Cited

U.S. PATENT DOCUMENTS

| | | | |
|---|---|---|---|
| 6,445,691 B2 * | 9/2002 | Sato ........................... 370/338 |
| 6,477,366 B1 * | 11/2002 | Valentine et al. ............ 455/416 |
| 6,490,452 B1 * | 12/2002 | Boscovic et al. ............ 455/436 |
| 6,512,930 B2 * | 1/2003 | Sandegren ................... 455/518 |
| 6,542,750 B2 * | 4/2003 | Hendrey et al. .......... 455/456.1 |
| 6,577,607 B1 * | 6/2003 | Mitts et al. ................ 370/310.1 |
| 6,591,114 B1 * | 7/2003 | Inbody ..................... 455/554.1 |
| 6,625,135 B1 * | 9/2003 | Johnson et al. ............. 370/332 |
| 6,690,948 B1 * | 2/2004 | Takiguchi et al. ........... 455/557 |
| 6,697,365 B1 * | 2/2004 | Messenger ................... 370/390 |
| 6,754,192 B2 * | 6/2004 | Kennedy ..................... 370/331 |
| 6,763,014 B2 * | 7/2004 | Kennedy ..................... 370/338 |
| 6,771,609 B1 * | 8/2004 | Gudat et al. ................. 370/254 |
| 6,882,856 B1 * | 4/2005 | Alterman et al. ............ 455/519 |
| 6,970,449 B1 * | 11/2005 | Smith et al. .................. 370/349 |
| 7,006,827 B2 * | 2/2006 | Masuda et al. .............. 455/439 |
| 7,085,558 B2 * | 8/2006 | Berstis et al. ................ 455/416 |
| 7,184,423 B2 * | 2/2007 | Bryan et al. ................. 370/338 |
| 7,218,930 B2 * | 5/2007 | Ko et al. ................... 455/426.1 |
| 7,277,707 B2 * | 10/2007 | Cao et al. .................... 455/436 |
| 7,292,869 B2 * | 11/2007 | Ukon .......................... 455/465 |
| RE39,989 E * | 1/2008 | Morris ..................... 455/426.1 |
| 7,328,020 B2 * | 2/2008 | Masuda et al. .............. 455/439 |

(Continued)

FOREIGN PATENT DOCUMENTS

JP 3515027 1/2004

(Continued)

*Primary Examiner*—Duc Nguyen
*Assistant Examiner*—Hai V Nguyen
(74) *Attorney, Agent, or Firm*—Oblon, Spivak, McClelland, Maier & Neustadt, P.C.

(57) ABSTRACT

A controller device for performing communication control of a mobile terminal belonging to an ad hoc network, includes: a communication environment information obtaining unit configured to obtain communication environment information, which shows a communication environment in the mobile terminal belonging to the ad hoc network, from the mobile terminal; and a proxy control information transmitter unit configured to transmit proxy control information for performing the communication control instead of the controller device, to a predetermined mobile terminal belonging to the ad hoc network, when the obtained communication environment information satisfies a predetermined condition.

11 Claims, 5 Drawing Sheets

U.S. PATENT DOCUMENTS

| | | | |
|---|---|---|---|
| 7,359,726 B2* | 4/2008 | Choksi | 455/519 |
| 7,376,425 B2* | 5/2008 | Laroia et al. | 455/437 |
| 7,397,779 B2* | 7/2008 | Chandra et al. | 370/332 |
| 7,398,088 B2* | 7/2008 | Belkin et al. | 455/439 |
| 7,433,362 B2* | 10/2008 | Mallya et al. | 370/408 |
| 7,463,890 B2* | 12/2008 | Herz et al. | 455/445 |
| 2002/0114282 A1* | 8/2002 | MeLampy et al. | 370/238 |
| 2002/0142769 A1* | 10/2002 | Taylor | 455/426 |
| 2002/0145975 A1* | 10/2002 | MeLampy et al. | 370/235 |
| 2002/0159418 A1* | 10/2002 | Rudnick et al. | 370/338 |
| 2002/0169887 A1* | 11/2002 | MeLampy et al. | 709/231 |
| 2003/0016655 A1* | 1/2003 | Gwon | 370/352 |
| 2003/0046440 A1* | 3/2003 | Ricciardi | 709/313 |
| 2003/0137959 A1* | 7/2003 | Nebiker et al. | 370/338 |
| 2003/0202512 A1* | 10/2003 | Kennedy | 370/389 |
| 2004/0001500 A1* | 1/2004 | Castillo | 370/437 |
| 2004/0023652 A1* | 2/2004 | Shah et al. | 455/426.2 |
| 2004/0033797 A1* | 2/2004 | Raivisto et al. | 455/405 |
| 2004/0057409 A1* | 3/2004 | Kennedy | 370/338 |
| 2004/0063458 A1 | 4/2004 | Hori et al. | |
| 2004/0090924 A1 | 5/2004 | Giaimo et al. | |
| 2004/0114557 A1* | 6/2004 | Bryan et al. | 370/338 |
| 2004/0127214 A1 | 7/2004 | Reddy et al. | |
| 2004/0148434 A1* | 7/2004 | Matsubara et al. | 709/246 |
| 2004/0162871 A1* | 8/2004 | Pabla et al. | 709/201 |
| 2005/0013276 A1* | 1/2005 | Ekl et al. | 370/332 |
| 2005/0025103 A1* | 2/2005 | Ko et al. | 370/338 |
| 2005/0070288 A1* | 3/2005 | Belkin et al. | 455/439 |
| 2005/0229180 A1* | 10/2005 | Ricciardi | 718/100 |
| 2005/0239468 A1* | 10/2005 | Segal | 455/444 |
| 2006/0002381 A1* | 1/2006 | Socaciu | 370/352 |
| 2006/0040656 A1* | 2/2006 | Kotzin | 455/426.2 |
| 2006/0058007 A1* | 3/2006 | Choksi | 455/406 |
| 2006/0058008 A1* | 3/2006 | Choksi | 455/406 |
| 2006/0077955 A1* | 4/2006 | Poustchi et al. | 370/352 |
| 2006/0092939 A1* | 5/2006 | Duggi et al. | 370/392 |
| 2006/0098577 A1* | 5/2006 | MeLampy et al. | 370/238 |
| 2006/0146766 A1* | 7/2006 | Nakajima et al. | 370/338 |
| 2006/0176863 A1* | 8/2006 | Robinson et al. | 370/338 |
| 2006/0209701 A1* | 9/2006 | Zhang et al. | 370/249 |
| 2007/0008937 A1* | 1/2007 | Mody et al. | 370/338 |
| 2007/0127429 A1* | 6/2007 | Bryan et al. | 370/338 |

FOREIGN PATENT DOCUMENTS

| | | |
|---|---|---|
| JP | 2004-80642 | 3/2004 |
| JP | 2004-104322 | 4/2004 |

* cited by examiner

CONTROLLER DEVICE, MOBILE TERMINAL AND MOBILE COMMUNICATION METHOD

CROSS REFERENCE TO RELATED APPLICATION

This application is based upon and claims the benefit of priority from the prior Japanese Patent Application No. P2004-326779, filed on Nov. 10, 2004; the entire contents of which are incorporated herein by reference.

BACKGROUND OF THE INVENTION

1. Field of the Invention

The present invention relates to a mobile communication method for performing communication control of a mobile terminal belonging to an ad hoc network, and to a controller device and a mobile terminal which realize the mobile communication method.

2. Description of the Related Art

A mobile communication method, in which communication between originating and destination mobile terminals in an ad hoc network is realized by causing a controller device to provide information on routing to the destination terminal for the originating mobile terminal based on the location information of the originating and terminating mobile terminals belonging to the ad hoc network, has conventionally been known.

However, in the conventional mobile communication method, the originating mobile terminal cannot obtain from the controller device the information on routing to the destination mobile terminal, when it is not possible to communicate between the controller device and the originating mobile terminal. Therefore, there has been a problem in that the communication between the originating and destination mobile terminals in the ad hoc network cannot be realized.

BRIEF SUMMARY OF THE INVENTION

The present invention has been made considering the problems, and its object is to provide a mobile communication method which can realize communication between originating and destination mobile terminals in an ad hoc network even if it is not possible to communicate between a controller device and the originating mobile terminal, and to provide a controller device and a mobile terminal which are used in the mobile communication method.

A first aspect of the present invention is summarized as a controller device for performing communication control of a mobile terminal belonging to an ad hoc network, including: a communication environment information obtaining unit configured to obtain communication environment information, which shows a communication environment in the mobile terminal belonging to the ad hoc network, from the mobile terminal; and a proxy control information transmitter unit configured to transmit proxy control information for performing the communication control instead of the controller device, to a predetermined mobile terminal belonging to the ad hoc network, when the obtained communication environment information satisfies a predetermined condition.

In the first aspect, the controller device can include a communication control result receiver unit configured to receive a result of the communication control performed by the predetermined mobile terminal instead of the controller device, when a connection between the mobile terminal belonging to the ad hoc network and the controller device is recovered.

In the first aspect, the communication environment information in the mobile terminal can be a state of a radio wave in the mobile terminal.

In the first aspect, the communication control of the mobile terminal can be routing control performed through the ad hoc network.

A second aspect of the present invention is summarized as a mobile terminal belonging to an ad hoc network, including: a communication environment information transmitter unit configured to transmit to a predetermined controller device communication environment information which shows a communication environment in the mobile terminal; a proxy control information receiver unit configured to receive proxy control information transmitted by the predetermined controller device, when the communication environment information satisfies predetermined conditions; and a proxy controller unit configured to perform communication control of a mobile terminal belonging to the ad hoc network instead of the predetermined controller device based on the received proxy control information, when a connection between the mobile terminal and the predetermined controller device is cut at the latest.

In the second aspect, the mobile terminal can include a communication control result transmitter unit configured to transmit to the predetermined controller device a result of the communication control performed instead of the predetermined controller device, when the connection between the mobile terminal and the controller device is recovered.

A third aspect of the present invention is summarized as a mobile communication method for performing communication control of a mobile terminal belonging to an ad hoc network, including: obtaining, at a controller device, communication environment information which shows a communication environment in the mobile terminal belonging to the ad hoc network from the mobile terminal; transmitting, at the controller device, proxy control information for performing the communication control instead of the controller device to a predetermined mobile terminal belonging to the ad hoc network, when the obtained communication environment information satisfies predetermined conditions; and performing, at the predetermined mobile terminal, the communication control of the mobile terminal belonging to the ad hoc network instead of the predetermined controller device based on the received proxy control information, when a connection between the mobile terminal belonging to the ad hoc network and the predetermined controller device is cut at the latest.

DETAILED DESCRIPTION OF THE INVENTION (Configuration of Mobile Communication System According to First Embodiment of the Present Invention)

Figure 1:
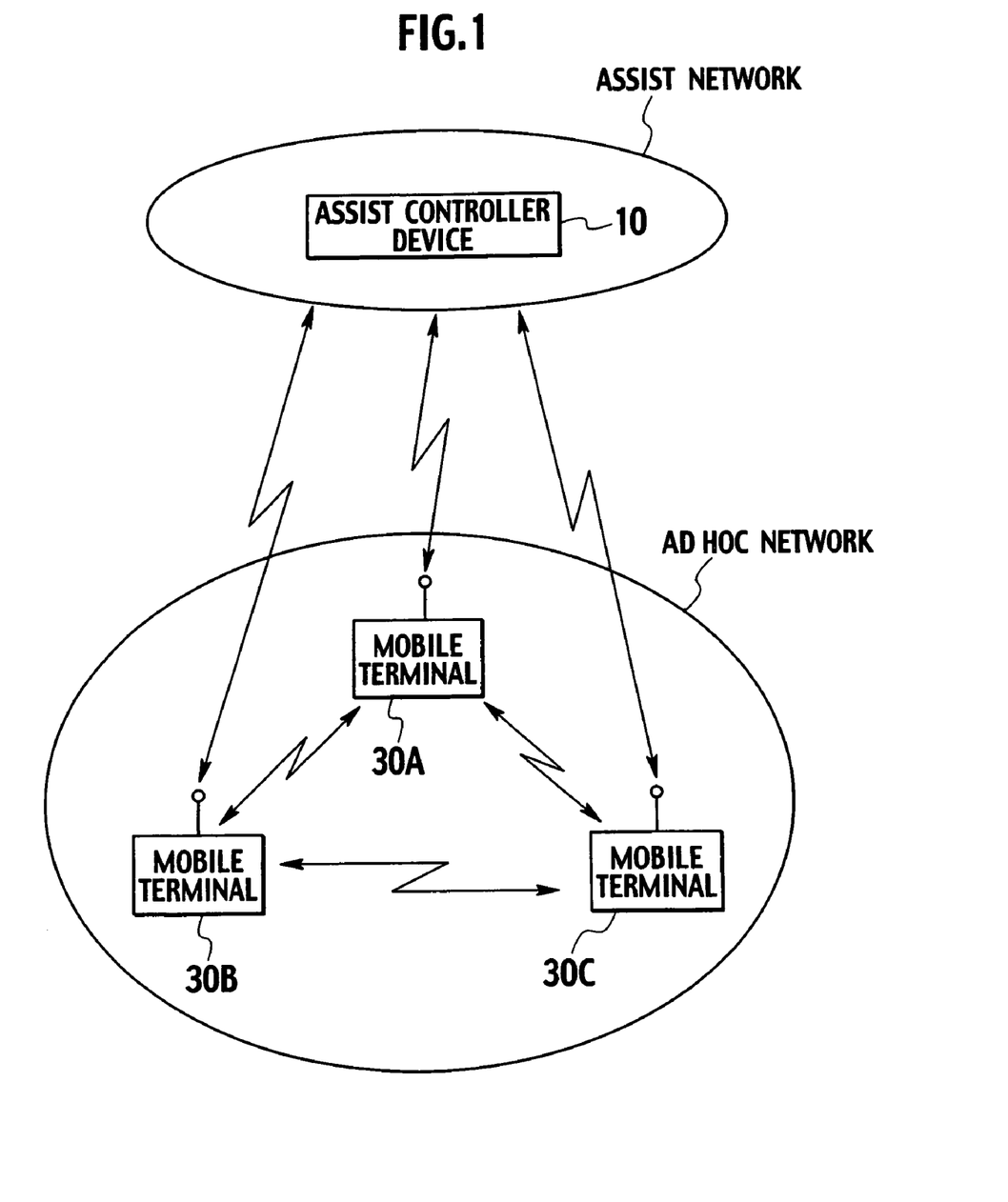
FIG. 1 is an entire configuration diagram of a mobile communication system according to a first embodiment of the present invention.
Figure 2:
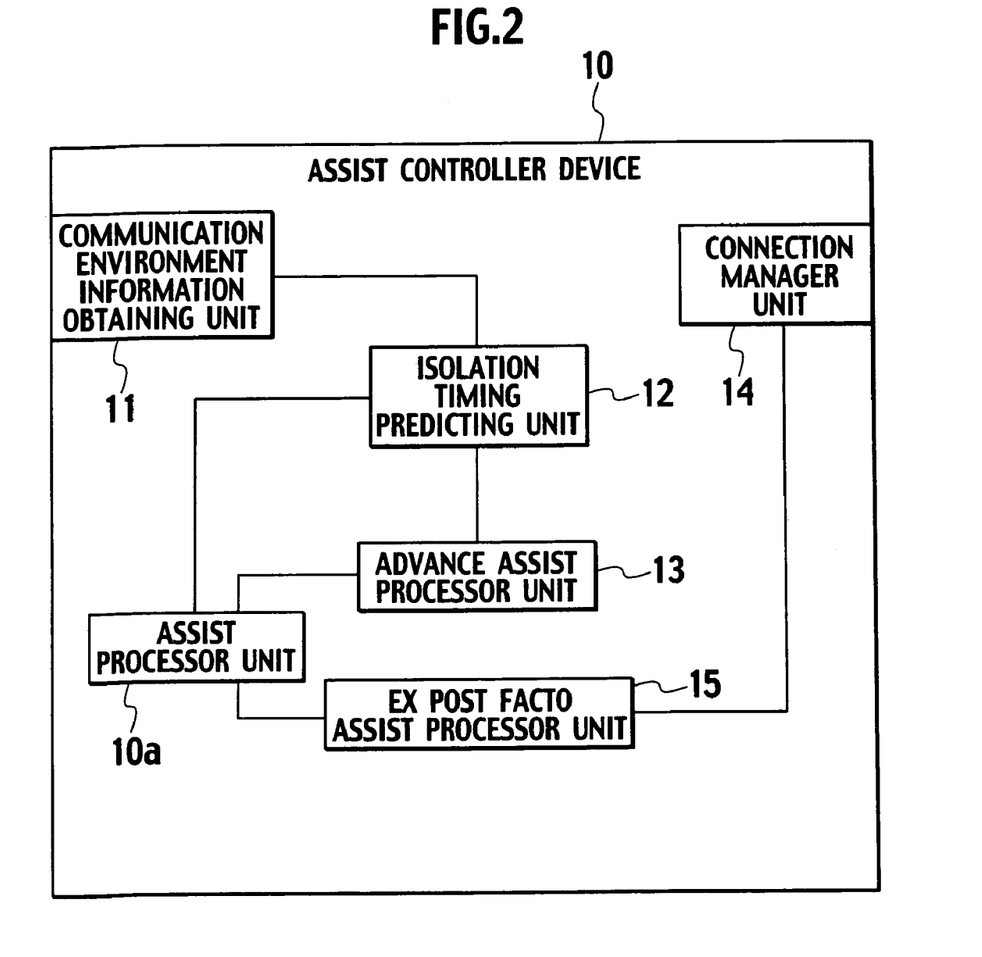
FIG. 2 is a functional block diagram of an assist controller device of the mobile communication system according to the first embodiment of the present invention.
Figure 3:
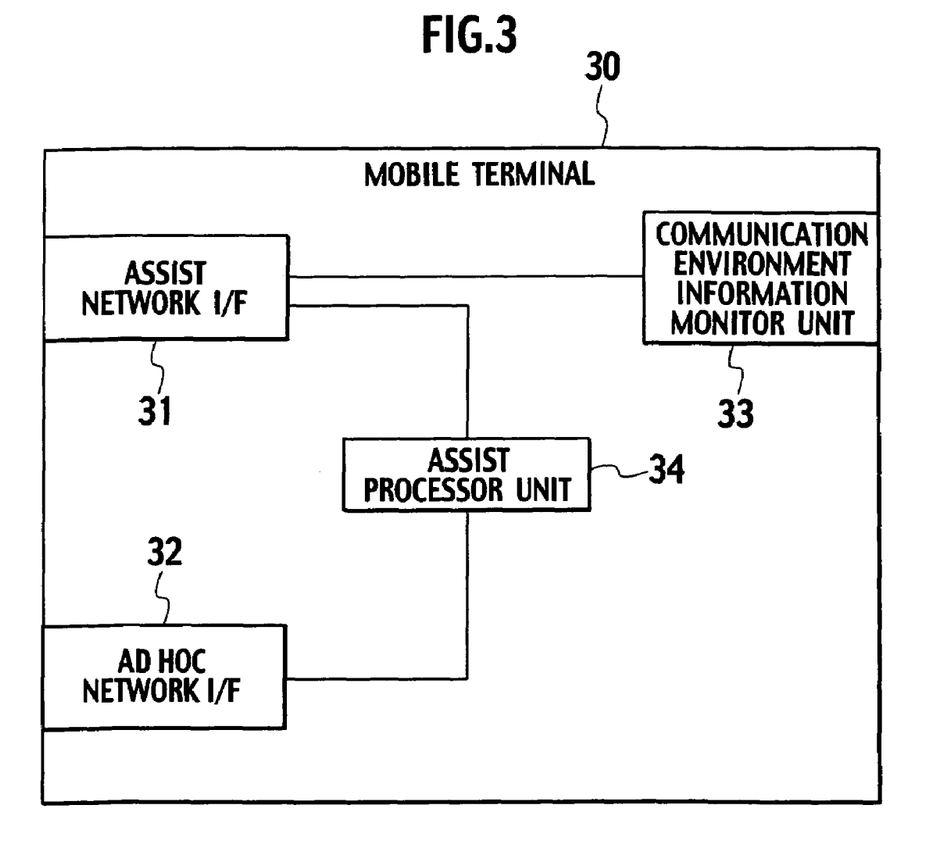
FIG. 3 is a functional block diagram of a mobile terminal of the mobile communication system according to the first embodiment of the present invention.

With reference to FIGS. 1 to 3, a description will be given of the configuration of a mobile communication system according to a first embodiment of the present invention.

As shown in FIG. 1, the mobile communication system according to this embodiment includes an assist controller device 10 and a plurality of mobile terminals 30A to 30C.

The assist controller device 10 is provided in an assist network configured of a public mobile communication network and the like, for example.

Furthermore, the plurality of mobile terminals 30A to 30C are configured to form an ad hoc network by performing direct communication with each other without communicating through the public mobile communication network.

The assist controller device 10 is a controller device configured to perform the communication control of a mobile terminal belonging to the ad hoc network.

Specifically, as shown in FIG. 2, the assist controller device 10 includes an assist processor unit 10a, a communication environment information obtaining unit 11, an isolation timing predicting unit 12, an advance assist processor unit 13, a connection manager 14 and an ex post facto assist processor unit 15.

The assist processor unit 10a is configured to perform the communication control among the mobile terminals 30A to 30C belonging to the ad hoc network, by providing predetermined services for the mobile terminals 30A to 30C.

For example, the assist processor unit 10a can perform routing control between originating and destination mobile terminals based on the location information of the originating and terminating mobile terminals belonging to the ad hoc network.

The communication environment obtaining unit 11 is configured to obtain communication environment information which shows communication environments in the mobile terminals 30A to 30C belonging to the ad hoc network from the mobile terminals 30A to 30C.

The communication environment obtaining unit 11 is configured to obtain the states of radio waves in the mobile terminals 30A to 30C as the communication environment information.

Received power, a signal-to-interference power ratio (SIR), a carrier-to-interference power ratio (CIR) and the like in the mobile terminals 30A to 30C can be cited as the state of the radio wave.

Note that the communication environment obtaining unit 11 may be configured to obtain information other than the state of the radio wave as the communication environment information, as long as the information is one which shows communication environments in the mobile terminals 30A to 30C.

Moreover, the communication environment obtaining unit 11 may be configured to: wait transmission from the mobile terminals 30A to 30C and then to obtain the communication environment information; or obtain the communication environment information by transmitting communication environment information obtaining requests to the mobile terminals 30A to 30C at a predetermined timing.

The isolation timing predicting unit 12 is configured to judge on whether or not the obtained communication environment information satisfies predetermined conditions.

Specifically, when the obtained communication environment information satisfies the predetermined conditions, the isolation timing predicting unit 12 predicts that a connection between the assist controller device 10 and the mobile terminals 30A to 30C is about to be cut (that is, the ad hoc network formed of the mobile terminals 30A to 30C is about to be isolated).

For example, the isolation timing predicting unit 12 judges that the obtained communication environment information satisfies the predetermined conditions, in cases such as when the average values of the received power, the signal-to-interference power ratio and the carrier-to-interference power ratio in the mobile terminals 30A to 30C become equal to or less than a predetermined threshold value.

In addition, the isolation timing predicting unit 12 may be configured to prepare the plurality of predetermined conditions and to predict a timing when the ad hoc network formed of the mobile terminals 30A to 30C is isolated, based on the predetermined conditions satisfied by the obtained communication environment information.

For example, when the average values of the received power, the signal-to-interference power ratio and the carrier-to-interference power ratio in the mobile terminals 30A to 30C become equal to or less than a first threshold value, the isolation timing predicting unit 12 predicts that the connection between the assist controller device 10 and the mobile terminals 30A to 30C is to be cut in 10 seconds (that is, the isolation timing is 10 seconds later).

On the other hand, when the average values of the received power, the signal-to-interference power ratio and the carrier-to-interference power ratio become equal to or less than a second threshold value (the first threshold value>the second threshold value), the isolation timing predicting unit 12 predicts that the connection between the assist controller device 10 and the mobile terminals 30A to 30C is to be cut in one second (that is, the isolation timing is one second later).

The advance assist processor unit 13 is configured to command a predetermined mobile terminal belonging to the ad hoc network to perform the communication control instead of the assist processor unit 10a, based on the judgment result by the isolation timing predicting unit 12.

Specifically, the advance assist processor unit 13 transmits proxy control information for performing the communication control between mobile terminals in the ad hoc network to a predetermined mobile terminal belonging to the ad hoc network (the mobile terminal 30A, for example) instead of the assist processor unit 10a of the assist controller device 10.

For example, the proxy control information includes: the prediction that the connection between the assist controller device 10 and the mobile terminals 30A to 30C is about to be cut (that is, the ad hoc network formed of the mobile terminals 30A to 30C is about to be isolated); the isolation timing; and a program or data necessary to perform the communication control between mobile terminals in the ad hoc network (for example, a program for performing routing control, the location information of the mobile terminals 30A to 30C, and the like).

Further, the advance assist processor unit 13 may be configured to adjust a timing of transmitting the above-mentioned proxy control information based on the isolation timing predicted by the isolation predicting timing unit 12.

Moreover, the advance assist processor unit 13 may give a command to perform the communication control instead of the assist processor unit 10a, not by transmitting the above-mentioned proxy control information to one mobile terminal, but by transmitting the above-mentioned proxy control information to a plurality of mobile terminals.

The connection manager 14 is configured to manage the connection between the assist controller device 10 and the mobile terminals 30A to 30C forming the ad hoc network. When detecting the recovery of the connection, the connection manager 14 notifies the ex post facto assist processor unit 15 of the recovery.

The ex post facto assist processor unit 15 is configured to perform ex post facto processing of the above-mentioned communication control performed by the predetermined mobile terminal instead of the assist processor unit 10a of the assist controller device 10, when the connection between the assist controller device 10 and the mobile terminals 30A to 30C belonging to the ad hoc network is recovered.

Specifically, the ex post facto assist processor unit 15 receives a result of the communication control performed by the predetermined mobile terminal (the mobile terminal 30A, for example) instead of the assist processor unit 10a of the assist controller device 10, when the connection between the assist controller device 10 and the mobile terminals 30A to 30C belonging to the ad hoc network is recovered.

Furthermore, the ex post facto assist processor unit 15 performs processing for causing the assist processor unit 10a to resume the communication control over the mobile terminals 30A to 30C in the ad hoc network based on the received result of the communication control.

For example, the ex post facto assist processor unit 15 takes over the location information of the mobile terminals 30A to 30C belonging to the ad hoc network from the predetermined mobile terminal as the received result of the communication control, and takes over communication records between the mobile terminals 30A to 30C belonging to the ad hoc network.

Next, with reference to FIG. 3, a description will be given of the configuration of a mobile terminal 30, which can perform the communication control instead of the assist processor unit 10a of the assist controller device 10, among mobile terminals belonging to the ad hoc network.

As shown in FIG. 3, the mobile terminal 30 includes an assist network interface (I/F) 31, an ad hoc network interface (I/F) 32, a communication environment information monitor unit 33 and an assist processor unit 34.

The assist network interface 31 is configured to function as an interface with the assist network.

For example, the assist network interface 31 transmits to the assist controller device 10 the communication environment information showing the communication environment in the mobile terminal 30 generated by the communication environment information monitor 33 at a predetermined timing.

Moreover, the assist network interface 31 receives the above-mentioned proxy control information from the assist controller device 10, and transfers the received proxy control information to the assist processor unit 34.

Additionally, the assist network interface 31 manages the connection between the mobile terminal 30 and the assist controller device 10. When the connection is cut, the assist network interface 31 notifies the assist processor unit 34 of the cutting.

The ad hoc network interface 32 is configured to function as an interface with the ad hoc network.

The ad hoc network interface 32 is configured to transmit and receive predetermined information by directly communicating with another mobile terminal belonging to the ad hoc network.

For example, while the assist processor unit 34 performs the communication control instead of the assist processor unit 10a of the assist controller device 10, the ad hoc network interface 32 obtains the location information of a relevant mobile terminal from another mobile terminal belonging to the ad hoc network, and transmits routing information to the mobile terminal.

The communication environment information monitor 33 is configured to generate the communication environment information by monitoring the communication environment in the mobile terminal 30A.

For example, the communication environment information monitor 33 generates the communication environment information showing the states of radio waves in the mobile terminals 30A to 30C (for example, the received power, the signal-to-interference power ratio and the carrier-to-interference power ratio and the like in the mobile terminals 30A to 30C).

Note that the communication environment information monitor 33 may be configured to generate the communication environment information including information other than the state of a radio wave, as long as it is the information showing the communication environments in the mobile terminals 30A to 30C.

The assist processor unit 34 is configured to perform the communication control of another mobile terminal belonging to the ad hoc network instead of the assist processor unit 10a of the assist controller device 10 based on the proxy control information received through the assist network interface 31, when the connection between the mobile terminal 30 and the assist controller device 10 is cut at the latest.

For example, the assist processor unit 34 performs the routing control between the originating and destination mobile terminals through the ad hoc network, by providing the information on the routing to the destination terminal for the originating terminal based on the location information of the originating and terminating mobile terminals belonging to the ad hoc network.

Note that the assist processor unit 34 may be configured to perform the above-mentioned communication control when a certain period of time has passed after receiving the above-mentioned proxy control information, as long as the assist processor unit 34 is configured to perform the above-mentioned communication control when the above-mentioned connection is cut at the latest.

In addition, when the connection between the mobile terminal 30 and the assist controller device 10 is recovered, the assist processor unit 34 transmits the result of the communication control performed instead of the assist processor unit 10a of the assist controller device 10, to the assist controller device 10 through the assist network interface 31.

(Operations of Mobile Communication System According to First Embodiment of the Present Invention)

Figure 4:
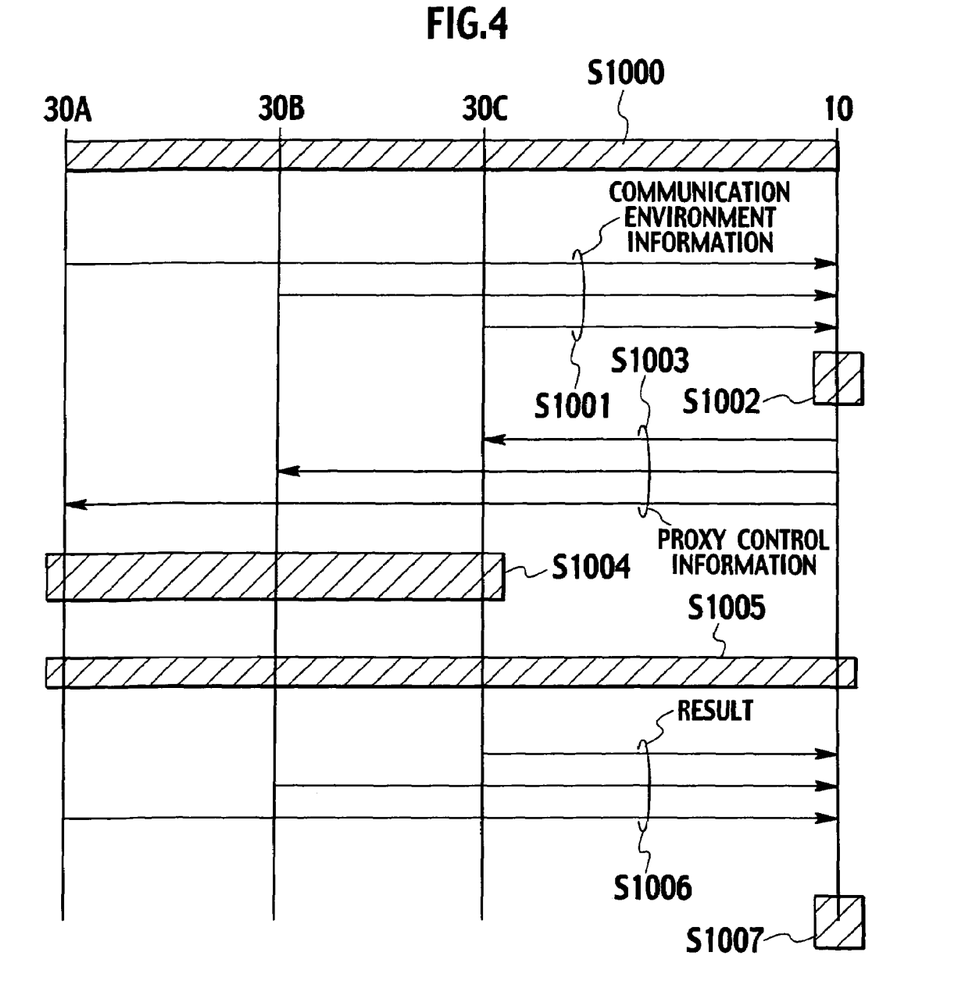
FIG. 4 is a sequence diagram showing the operations of the mobile communication system according to the first embodiment of the present invention.

With reference to FIG. 4, a description will be given of the operations in which the communication between the mobile terminals 30A to 30C belonging to the ad hoc network transits in the mobile communication system according to the first embodiment of the present invention from a state of being controlled by the assist controller device 10 to a state of being autonomously controlled by the predetermined mobile terminals 30A to 30C.

As shown in FIG. 4, in Step S1000, the connection between the assist controller device 10 and the mobile terminals 30A to 30C is connected.

In Step 1001, each of the mobile terminals 30A to 30C transmits their communication environment information to the assist controller device 10 at a predetermined timing.

In Step 1002, since the communication environment information satisfies the predetermined conditions, the assist controller device 10 predicts that the connection between the assist controller device 10 and the mobile terminals 30A to 30C is about to be cut (that is, the ad hoc network formed of the mobile terminals 30A to 30C is about to be isolated).

In Step 1003, the assist controller device 10 transmits the proxy control information to the mobile terminals 30A to 30C.

In Step 1004, the mobile terminals 30A to 30C independently performs the communication control between the mobile terminals 30A to 30C belonging to the ad hoc network based on the received proxy control information.

In Step 1005, the connection between the mobile terminals 30A to 30C and the assist controller device 10 is recovered, the mobile terminals 30A to 30C detect the recovery, and thus transmit to the assist controller device 10 the results of the communication control performed instead of the assist controller device 10 in Step 1006.

In Step 1007, the assist controller device 10, based on the results of the received communication control, takes over the state of the communication control for a period when the connection between the mobile terminals 30A to 30C and the assist controller device 10 is cut, and thereafter performs the communication control in the ad hoc network.

Figure 5:
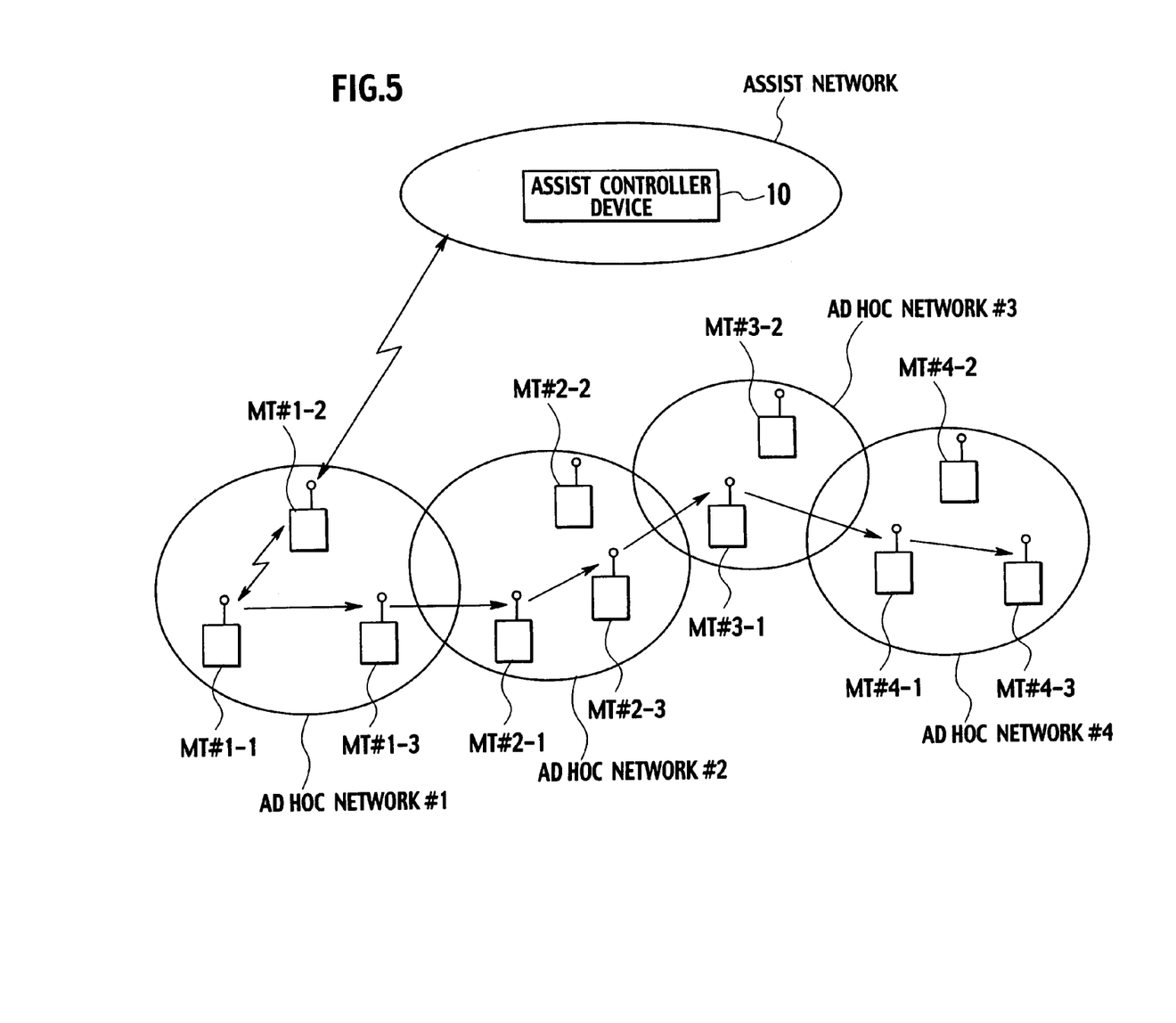
FIG. 5 is a diagram showing an example of the operations of the mobile communication system according to the first embodiment of the present invention.

In an example of FIG. 5, immediately before an ad hoc network #1 formed of mobile terminals MT #1-1 to MT #1-3 is isolated (that is, immediately before the connection between the assist controller device 10 and the mobile terminals MT #1-1 to MT #1-3 is cut), the assist controller device 10 transmits the proxy control information (such as the location information of the mobile terminals MT #1-1 to MT #1-3 and the routing control program) to the predetermined mobile terminal MT #1-2.

Then, the assist controller device 10 commands the predetermined mobile terminal MT #1-2 to perform routing control in the ad hoc network #1.

As a result, the predetermined mobile terminal MT #1-2 performs the routing control in the ad hoc network #1 instead of the assist controller device 10, and thus there arises no trouble in a packet transfer from the plurality of ad hoc networks #1 to #4 even if the ad hoc network #1 is isolated.

Note that the present invention can be applied to other cases (such as, for example, a case where a predetermined mobile terminal entitles a function of Authentication, Authorization and Accounting (AAA) of the assist controller device 10, and the like), without being limited to the case where a predetermined mobile terminal carries out the function of the routing control instead of the assist controller device 10.

(Actions and Effects of Mobile Communication System According to First Embodiment of the Present Invention)

With the mobile communication system according to the first embodiment of the present invention, predetermined services (such as a routing information providing service) can be provided instead of the assist controller device 10 for the mobile terminal 30 belonging to the ad hoc network, by causing the predetermined mobile terminal 30A to use the proxy control information transmitted from the assist controller device 10, if the advance assist processor unit 13 transmits the proxy control information to the predetermined mobile terminal 30A, and even if the predetermined conditions are satisfied (for example, even if the state of a radio wave between the assist controller device 10 and the originating mobile terminal 30 is being deteriorated).

Furthermore, with the mobile communication system according to the first embodiment of the present invention, the assist controller device 10 can quickly and easily resume providing the predetermined services (for example, the routing information providing service) for the mobile terminal 30 belonging to the ad hoc network, by use of the result of the communication control by the predetermined mobile terminal 30A.

The present invention can provide a mobile communication method which can realize communication between originating and destination mobile terminals in an ad hoc network even if it is not possible to communicate between a controller device and the originating mobile terminal, and to provide a controller device and a mobile terminal which are used in the mobile communication method.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A controller device for performing communication control of mobile terminals belonging to an ad hoc network by providing routing information for the mobile terminals, the controller device comprising:

a communication environment information obtaining unit configured to obtain communication environment information, which shows a communication environment in each of the mobile terminals belonging to the ad hoc network, from each of the mobile terminals;

an isolation timing predicting unit configured to predict a time when connections between all of the mobile terminals belonging to the ad hoc network and the controller device are cut, upon receipt of communication environment information satisfying a predetermined condition; and an advance assist processor unit configured to command a predetermined mobile terminal of the mobile terminals belonging to the ad hoc network to perform the communication control instead of the controller device, at the time when the isolation timing predicting unit predicts connections between all of the mobile terminals belonging to the ad hoc network and the controller device are cut.

2. The controller device according to claim 1, comprising an ex post facto assist processor unit configured to receive a result of the communication control performed by the predetermined mobile terminal instead of the controller device, when a connection between the mobile terminals belonging to the ad hoc network and the controller device is recovered.

3. The controller device according to claim 1, wherein the communication environment information in each of the mobile terminals is a state of a radio wave in each of the mobile terminals, and the isolation timing predicting unit predicts the time when connections between all of the mobile terminals belonging to the ad hoc network and the controller device are cut, when the radio wave in each of the mobile terminals falls below a predetermined threshold value.

4. The controller device according to claim 1, wherein the communication control of the mobile terminals is a routing control performed by providing the routing information to a destination mobile terminal for an originating mobile terminal based on location information of the originating mobile terminal belonging to the ad hoc network and location information of a terminating mobile terminal belonging to the ad hoc network.

5. The controller device according to claim 1, wherein the proxy control information includes information indicating a time when the connections between all of the mobile terminals belonging to the ad hoc network and the predetermined controller device are cut, and data to perform the communication control.

6. A mobile terminal belonging to an ad hoc network and communicating with other mobile terminals belonging to the ad hoc network by obtaining routing information from a predetermined controller device, the mobile terminal comprising:

an assist network interface unit configured to transmit to the predetermined controller device communication environment information which shows a communication environment in the mobile terminal and to receive proxy control information transmitted by the predetermined controller device, when the predetermined controller device predicts a time when connections between all of the mobile terminals belonging to the ad hoc network and the predetermined controller device are cut based on the communication environment information, the proxy control information indicating that the mobile terminal conduct communication control instead of the controller device; and an assist processor unit configured to perform the communication control of the mobile terminals belonging to the ad hoc network instead of the predetermined controller device, the communication control being based on the received proxy control information, when connections between the mobile terminals and the predetermined controller device are cut.

7. The mobile terminal according to claim 6, comprising an ex post facto assist processor configured to transmit to the predetermined controller device a result of the communication control performed instead of the predetermined controller device, when the connection between the mobile terminal and the controller device is recovered.

8. The mobile terminal according to claim 6, wherein the assist processor unit obtains a location information of an originating mobile terminal belonging to the ad hoc network and obtains a location information of a terminating mobile terminal belonging to the ad hoc network, and the assist processor unit provides the routing information to a destination mobile terminal for the originating mobile terminal based on the location information of the originating mobile terminal and location information of the terminating mobile terminal.

9. The mobile terminal according to claim 6, wherein the proxy control information includes information showing a time when the connections between all of the mobile terminals belonging to the ad hoc network and the predetermined controller device are cut, and data to perform the communication control.

10. A mobile communication method for performing communication control of mobile terminals, each of the mobile terminals belonging to an ad hoc network and communicating with other mobile terminals belonging to the ad hoc network by obtaining routing information from a predetermined controller device, the mobile communication method comprising:

obtaining, at the predetermined controller device, communication environment information which shows a communication environment in each of the mobile terminals belonging to the ad hoc network from each of the mobile terminals;

predicting, at the predetermined controller device, a time when connections between all of the mobile terminals belonging to the ad hoc network and the predetermined controller device are cut, when the obtained communication environment information satisfies a predetermined condition;

commanding, at the predetermined controller device, a predetermined mobile terminal of the mobile terminals belonging to the ad hoc network to perform the communication control instead of the predetermined controller device by transmitting proxy control information for performing the communication control to the predetermined mobile terminal, when the predetermined controller device predicts a time when the connections between all of the mobile terminals belonging to the ad hoc network and the predetermined controller device are cut; and performing, at the predetermined mobile terminal, the communication control of the mobile terminals belonging to the ad hoc network instead of the predetermined controller device based on the received proxy control information, when the connections between all of the mobile terminals belonging to the ad hoc network and the controller device are cut.

11. The mobile communication method according to claim 10, wherein the proxy control information includes information indicating a time when the connections between all of the mobile terminals belonging to the ad hoc network and the predetermined controller device are cut, and data to perform the communication control.

* * * * *